J. M. NASH.
ABRADING MACHINE.
APPLICATION FILED AUG. 12, 1907.
969,183.
Patented Sept. 6, 1910.
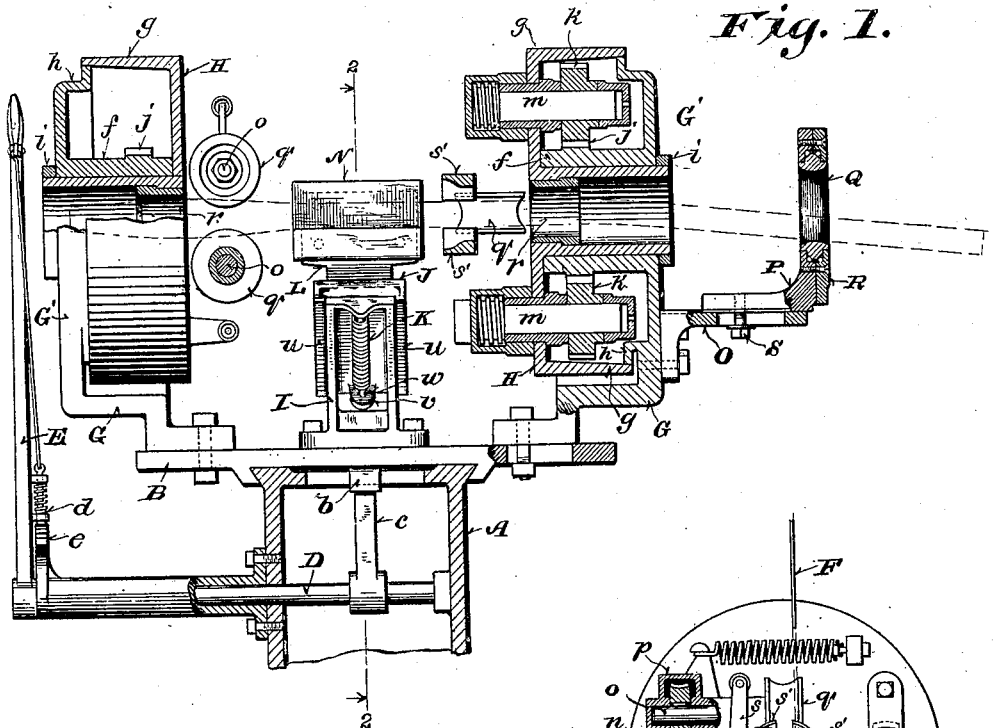
Witnesses:
Fred Palm
George Felber
Inventor:
John M. Nash
By Oliphant & Young
Attorneys

UNITED STATES PATENT OFFICE.

JOHN M. NASH, OF WAUWATOSA, WISCONSIN.

ABRADING-MACHINE.

969,183.  Specification of Letters Patent.  Patented Sept. 6, 1910.

Application filed August 12, 1907. Serial No. 388,148.

*To all whom it may concern:*

Be it known that I, JOHN M. NASH, a citizen of the United States, and resident of Wauwatosa, in the county of Milwaukee and State of Wisconsin, have invented certain new and useful Improvements in Abrading-Machines; and I do hereby declare that the following is a full, clear, and exact description thereof.

The improvements relate to machines of the species set forth in my Patent No. 672,511 granted April 23, 1901, the improved machine being especially designed for smoothing bent work of circular form in cross-section and having for its novel features the peculiar work-support and the peculiar work-guide herein shown, described and claimed.

Figure 1 of the accompanying drawings represents a partly sectional side elevation of my improved machine; Fig. 2, a transverse section view of the machine, this view being indicated by lines 2—2 in Fig. 1; Fig. 3, a section view of a fragment of said machine on the plane indicated by line 3—3 in Fig. 2, and Fig. 4, an end elevation of another fragment of the aforesaid machine partly broken.

Referring by letter to the drawings, A indicates a standard, B a table in dove-tail sliding fit on said standard, and C an adjusting screw by which the throw of said table is regulated. An underside rack $b$ of the table meshes with a toothed sector $c$ fast on an arbor D for which the standard is provided with bearings, and fast on the outer end of the arbor is a lever E provided with a spring-controlled latch $d$ engageable with a ratchet-segment $e$ extending from one of the bearings for said arbor. By means of the lever-controlled mechanism, the table is moved to bring the work to and from an abrading-belt F indicated in Fig. 2.

Mounted on the table are opposite brackets G one at least of which is preferably adjustable, and each of these brackets has a disk portion G' thereof provided with an inwardly extending sleeve $f$ engaged by the hub of a circular head H having a flange $g$ that overlaps the periphery of a flange $h$ of the disk-portion of the adjacent bracket, said head with its hub and flange constituting a rotary drum held in working position by a collar $i$ fast on the outer end of said hub against said disk-portion of said bracket. Each sleeve $f$ is provided with a series of spur-gear teeth $j$ at regular intervals of a circle, and spur-gear pinions $k$ on spindles $m$ mesh with said teeth, the adjacent drum-head being provided with bearings for the spindles.

Each spindle $m$ has a worm-end that meshes with a worm-pinion $n$ on another spindle $o$ supported in a bracket $p$ having spring-controlled oscillative connection with the adjacent drum-head, a portion of the bracket serving as a casing for the worm-gearing. Opposing concave feed-rollers $q$ are arranged on the spindles $o$ to turn therewith, and these rollers may be faced with an elastic material so as not to mar the work fed thereby.

Each drum-head hub is provided with a bushing $r$ that is preferably funnel-shaped at the mouth, and bushings of varying diameter of bore may be interchangeably employed to accommodate work of varying maximum thickness.

The rotary drums are to be driven by belt or otherwise, their rotation and the gearing above specified serving to impart planetary movement to the feed-rollers, whereby the stuff run through the machine is kept constantly turning, and the proper feed of said stuff facilitated by the funnel-section extremities $s'$ of plates $s$ in connection with the heads of said drums.

The general construction and operation of the movable parts above specified is similar to what is set forth in the patent aforesaid and in my Patent No. 430,398, granted June 17, 1890 showing an adjustable lever-controlled reciprocative table, the work being fed through the bushing of the drum at the lever-end of the machine and caught between the adjacent pair of feed-rollers that are under spring-tension. These rollers automatically accommodate themselves to work of varying thickness, and the table is operated to put said work in yielding contact with the abrading-belt. The work is eventually caught by the next pair of feed-rollers and fed through the adjacent drum opposite the one at which the operation begun and said work is thus traveled its whole length in contact with the abrader.

It has been found desirable to employ a preferably adjustable right-angle work-support located between the two pairs of feed-rollers, and also to provide for automatic accommodation of said support to work of varying thickness. To this end the table B is shown provided with a bracket I, constituting a rest a portion of which bracket is inclined at an angle of approximately 45° to the axis of the drums and work in the machine. Engaged by upper lateral flanges *t* of the inclined portion of the bracket are grooves in depending side flanges *u* of a plate J having its lower end provided with a central inwardly extending apertured lug *v* in which the shank of a screw-hook *w* is adjustably secured by means of a set-nut *x*, this hook being connected to one end of a spring K attached at its other end, under tension, to a center lug of an upper cross-bar *y* of said bracket, the tension being regulated by the adjustment of said hook. The slide plate is provided with underside stops *z* in opposition to the cross-bar of the bracket and mounted on said plate is the longitudinally slotted shank-portion of an angular holder L that is held in adjusted position by a set-screw M engaging the slot and a corresponding threaded aperture in the aforesaid plate. Fastened by screws or other suitable means to the upper vertical end of the holder is a block N having a right-angle notch for the engagement of the work fed to the machine, the angle of the notch being on an inclined plane of approximately 45° radial to the axis of the work supported by said block. Interchangeable blocks having notches of varying size may be employed in connection with the holder. The plate J, holder L and block N therewith have automatic sliding yield against resistance of the spring K to compensate for varying thickness of work greater than the minimum thickness for which said block with its holder is set, this yield being radial to the axis of said work whereby the recession of the aforesaid block is approximately the same in a vertical and horizontal direction, this being an important feature of the machine.

Attached to the bracket G at the delivery-end of the machine is shown a longitudinally slotted auxiliary bracket O, and in tongue-and-groove adjustable engagement with the auxiliary bracket horizontally of the same is an elbowed arm P, the vertical portion of which arm is provided with a ball-race and engaged by a cone-ribbed ring Q in contact with the balls in said race. The ring also engages a plate R that is bolted to said arm and provided with a race for balls in contact with the cone-rib of said ring. The ring constitutes an anti-friction guide for bent work coming from the machine and not only confines the sweep of same within a restricted circular area but also prevents a flight of said work when it clears the last drum of the machine. A set-screw S engages the slot of the bracket O and the adjacent portion of the arm P to hold said arm in adjusted position.

I claim:

1. In a machine comprising an abrading device, spring-controlled oscillative feed-rollers and means for imparting planetary movement to the rollers; a spring-controlled work-support arranged to have automatic sliding yield in the direction of an inclined plane radial to the axis of the work thereon to compensate for varying thickness of said work opposed to the abrading device.

2. In a machine comprising an abrading device, spring-controlled oscillative feed-rollers and means for imparting planetary movement to the rollers; an independently adjustable spring-controlled work-support arranged to have automatic sliding yield in the direction of an inclined plane radial to the axis of the work thereon to compensate for varying thickness of said work opposed to the abrading device.

3. In a machine comprising an abrading device, spring-controlled oscillative feed-rollers and means for imparting planetary movement to the rollers; a stationary inclined rest, and a work-support in spring-controlled sliding connection with the rest to have automatic yield in the direction of the incline of said rest radial to the axis of the work upon said support in opposition to the abrading device.

4. In a machine comprising an abrading device, spring-controlled oscillative feed-rollers and means for imparting planetary movement to the rollers; a stationary inclined rest, a plate in spring-controlled sliding connection with the rest, and a work-support in connection with the plate to yield therewith in the direction of the incline of said rest radial to the axis of the work upon said support in opposition to the abrading device.

5. In a machine comprising an abrading device, spring-controlled oscillative feed-rollers and means for imparting planetary movement to the rollers; a stationary inclined rest, a plate in spring-controlled sliding connection with the rest, and a work-support in independently adjustable connection with the plate longitudinally of the same, to yield therewith in the direction of the incline of said rest radial to the axis of the work upon said support in opposition to the abrading device.

6. In a machine comprising an abrading device, spring-controlled oscillative feed-rollers and means for imparting planetary movement to the rollers; a stationary inclined rest, and an independently adjustable work-support in spring-controlled sliding connection with the rest to have automatic yield in the direction of the incline of said rest radial to the axis of the work upon said support in opposition to the abrading device.

7. In an abrading-machine of the type specified, a support at the delivery end of the machine and a ring loose in the support to constitute an anti-friction guide for abraded bent work.

8. In an abrading-machine of the type specified a horizontally adjustable support at the delivery end of the machine, and a ring loose in the support to constitute an anti-friction guide for abraded bent work.

9. The combination with an abrading-device, of feed-mechanism, and a suitably arranged rotary anti-friction guide for bent-work fed by said mechanism.

10. The combination with an abrading-device, of feed-mechanism, a work-support, and a suitably arranged rotary annular guide for bent-work fed by said mechanism.

In testimony that I claim the foregoing I have hereunto set my hand at Milwaukee in the county of Milwaukee and State of Wisconsin in the presence of two witnesses.

JOHN M. NASH.

Witnesses:
N. E. OLIPHANT,
GEORGE FELBER.